(12) United States Patent
Kinoshita et al.

(10) Patent No.: US 7,265,191 B2
(45) Date of Patent: Sep. 4, 2007

(54) MULTI-FUNCTIONAL ADMIXTURES FOR HYDRAULIC CEMENT COMPOSITIONS

(75) Inventors: Mitsuo Kinoshita, Gamagori (JP); Kazuhide Saitou, Gamagori (JP); Shinji Tamaki, Gamagori (JP); Masahiro Iida, Gamagori (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 524 days.

(21) Appl. No.: 10/938,168

(22) Filed: Sep. 10, 2004

(65) Prior Publication Data

US 2005/0096413 A1    May 5, 2005

(30) Foreign Application Priority Data

Oct. 30, 2003    (JP) .............................. 2003-370278

(51) Int. Cl.
*C08F 34/02* (2006.01)
(52) U.S. Cl. .......................... 526/271; 526/82; 526/83; 526/84; 526/85
(58) Field of Classification Search .................. 526/82, 526/83, 84, 85, 271
See application file for complete search history.

(56) References Cited

U.S. PATENT DOCUMENTS 3,414,547 A * 12/1968 Thompson et al. ........... 526/86
4,946,904 A * 8/1990 Akimoto et al. .......... 525/327.8
4,962,173 A * 10/1990 Kinoshita et al. .............. 528/15
5,142,036 A * 8/1992 Akimoto et al. ........... 536/18.3
5,362,829 A * 11/1994 Kinoshita et al. ............ 526/240
6,492,445 B2 * 12/2002 Siddiqui et al. ............ 524/156
6,552,141 B1 * 4/2003 Chmelir et al. ............. 526/217
6,730,764 B1 * 5/2004 Ikuta et al. .................. 526/319

FOREIGN PATENT DOCUMENTS

| JP | 2000-026437 | * | 1/2000 |
| JP | 2001-172324 | * | 6/2001 |
| JP | 2003-171156 | * | 6/2003 |

* cited by examiner

*Primary Examiner*—Bernard Lipman
(74) *Attorney, Agent, or Firm*—Beyer Weaver LLP

(57) ABSTRACT

A multi-functional admixture for simultaneously providing specified characteristics to hydraulic cement compositions such as concrete contains one or more of specified reaction mixtures obtained by specified two processes as well as partially or completely neutralized substances obtained from such a reaction mixture through a specified third process. The specified two processes include initiating a radical copolymerization process of a radical polymerizable monomer mixture containing maleic anhydride and a monomer of a specified kind in a non-aqueous system in the presence of a non-aqueous radical initiator and stopping the radical copolymerization reaction in its midst while the inversion rate of polymerization is at a specified level by adding water to the reaction system to thereby obtain a reaction mixture. The specified third process is for partially or completely neutralizing the reaction mixture.

9 Claims, 1 Drawing Sheet

MULTI-FUNCTIONAL ADMIXTURES FOR HYDRAULIC CEMENT COMPOSITIONS

Priority is claimed on Japanese Patent Application 2003-370278 filed Oct. 30, 2003.

BACKGROUND OF THE INVENTION

This invention relates to multi-functional admixtures for hydraulic cement compositions and more particularly to multi-functional admixtures capable of providing not only hydraulic cement compositions having a normal water/cement ratio but also those having a small water/cement ratio simultaneously with a plurality of functional characteristics that are desirable to such compositions.

Many kinds of admixtures for hydraulic cement compositions have been known. For example, many kinds of compounds of polycarboxylic acid have been known as a dispersant capable of providing fluidity to hydraulic cement compositions, as disclosed in Japanese Patent Publications Tokko 58-38380 and Tokkai 2001-48620, Japanese Patent 2541218, and U.S. Pat. Nos. 4,946,904, 4,962,173, 5,142,036 and 5,362,829. There are several problems with these prior art admixtures, however, when they are used with hydraulic cement compositions with a small water/cement ratio. For example, it requires a long time of kneading in preparing the hydraulic cement composition, the viscosity of the prepared hydraulic cement composition is too high and its fluidity is not sufficient, the autogeneous shrinkage of the hardened object obtained from the prepared hydraulic cement composition is too large and the strength of such a hardened object is not sufficiently high.

SUMMARY OF THE INVENTION

It is therefore an object of this invention to provide multi-functional admixtures for hydraulic cement compositions capable of producing hydraulic cement composition not only with an ordinary water/cement ratio but also with a small water/cement ratio such that the time required for kneading in the production may be short, the viscosity of produced hydraulic cement composition has a low viscosity and its fluidity is high, the autogeneous shrinkage of hardened objects produced from produced hydraulic cement compositions is small and the strength of such hardened objects is high.

The present invention is based on the discovery by the present inventors as a result of their diligent studies in view of the object described above that those comprised of one or more of a group of reaction mixtures obtained through specified processes are appropriate as a multi-functional admixture for hydraulic cement compositions.

DETAILED DESCRIPTION OF THE INVENTION

Figure 1:
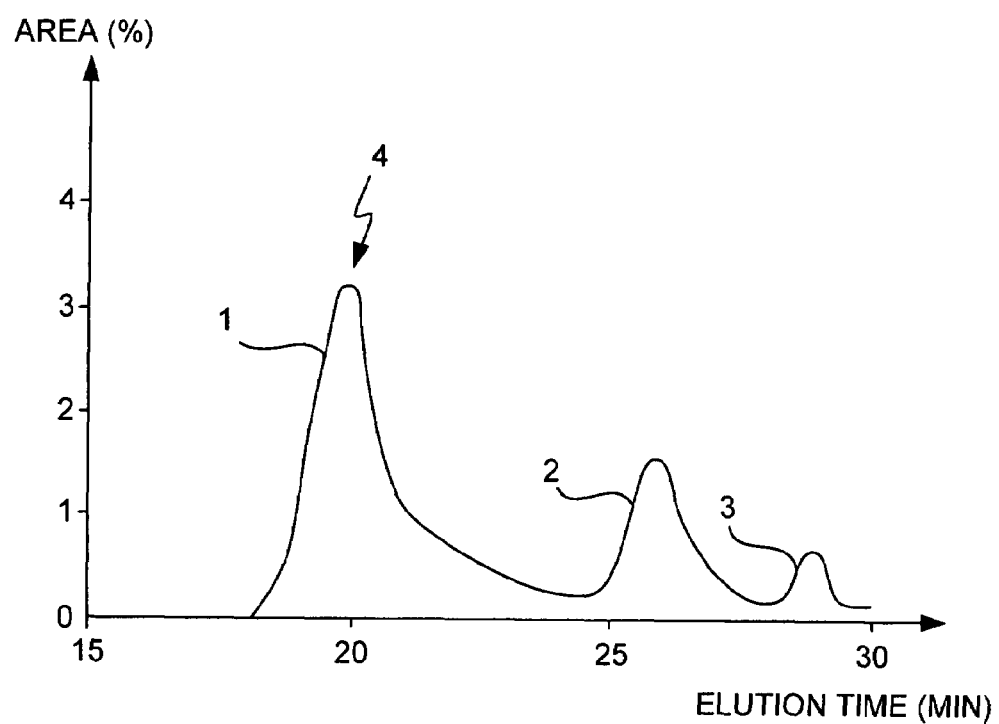
FIG. 1 is a graph obtained from a reaction mixture obtained by this invention when it was analyzed by gel-permeation chromatography.

The invention relates to multi-functional admixtures for hydraulic cement compositions characterized as comprising one or more selected from specified reaction mixtures obtained by Process 1 and Process 2 as well as partially or completely neutralized substances obtained further by Process 3 wherein Process 1 is a process of initiating a radical copolymerization process of a radical polymerizable monomer mixture containing maleic anhydride and a monomer shown by Formula 1 by 97 molar % or more at a molar ratio of 50/50-70/30 in a non-aqueous system in the presence of a non-aqueous radical initiator, Process 2 is a process of stopping the radical copolymerization reaction initiated in Process 1 in the midst of the reaction while the inversion rate of polymerization defined by $\{(TM-UM)/TM\}\times 100$ becomes 50-90% by adding water to the reaction system and thereby obtaining a reaction mixture containing a copolymer thus produced and residual monomers, TM indicating the total weight of the radical polymerizable monomer mixture at the start of the radical polymerization reaction in Process 1 and UM indicating the total weight of the residual monomers when the radical copolymerization reaction is stopped in Process 2, Process 3 is a process of partially or completely neutralizing the reaction mixture obtained in Process 2 by one or two selected from alkali metal hydroxides, alkali earth metal hydroxides and amines, and Formula 1 is given by $CH_2=CH-CH_2-O-A-O-R$ where R is methyl group, acetyl group or hydrogen atom and A is a residual group obtained by removing all hydroxyl groups from (poly) alkyleneglycol having (poly)oxyalkylene groups formed with 1-150 oxyethylene units or a total of 2-150 oxyethylene and oxypropylene units.

Multi-functional admixtures for hydraulic cement compositions according to this invention (hereinafter referred to simply as admixtures of this invention) include (1) reaction mixtures obtained by Processes 1 and 2, (2) partially or completely neutralized products of such a reaction mixture obtained further through Process 3, or one or more selected from (1) and (2). In other words, admixtures of this invention include one or more selected from the reaction mixtures, one or more selected from the partially or completely neutralized products of (2) and the mixtures of the above.

Process 1 is a process of initiating a radical copolymerization process of a radical polymerizable monomer mixture in a non-aqueous system in the presence of a non-aqueous radical initiator. Examples of the radical polymerizable monomer mixture that may be used include those containing maleic anhydride and monomer shown by Formula 1 by 97 molar % or more as a total and preferably by 100 molar % at a molar ratio of 50/50-70/30 or preferably 55/45-65/35.

Regarding Formula 1, R may be methyl group, acetyl group or hydrogen atom but preferably be methyl group or acetyl group.

Regarding Formula 1, examples of what A may be include (1) residual groups obtained by removing all hydroxyl groups from (poly) ethyleneglycol having within its molecule (poly)oxyethylene groups entirely made of oxyethylene units and (2) residual groups obtained by removing all hydroxyl groups from (poly)ethylene(poly)propyleneglycol having within its molecules (poly)oxyethylene(poly)oxyprolylene group made of both oxyethylene units and oxypropylene units, but examples of (1) are preferable. In the case of (2), the oxyethylene units and oxypropylene units may be in random or block combination but examples with random combination are preferable. The repetition number of the oxyalkylene units in A may be 1-150 and preferably 15-90.

In other words, preferable monomers are those shown by Formula 1 where R is methyl group or acetyl group and A is a residual group obtained by removing all hydroxyl groups from polyethyleneglycol having polyoxyethylene groups made of 15-90 oxyethylene units.

Examples of such monomers shown by Formula 1 as explained above include (1) α-allyl-ω-methyl-(poly)oxyethylene; (2) α-allyl-ω-methyl-(poly)oxyethylene (poly)oxypropylene; (3) α-allyl-ω-acetyl-(poly)oxyethylene; (4) α-allyl-ω-acetyl-(poly)oxyethylene(poly)oxypropylene; (5) α-allyl-ω-hydroxy-(poly)oxyethylene; and (6) α-allyl-ω-hydroxy-(poly)oxyethylene(poly)oxypropylene.

The radical polymerizable monomer mixture to be used in Process 1 is a mixture containing maleic anhydride and monomer shown by Formula 1 by 97 molar % or more as a total and preferably by 100 molar %. This means that radical polymerizable monomers of other types may be contained by 3 molar % or less. Examples of such radical polymerizable monomers of other types include styrene, vinyl acetate, acrylic acid, salts of acrylic acid, alkyl acrylates, (metha) allyl sulfonic acid and salts of (metha)allyl sulfonic acid.

Process 1 is a process of initiating a radical copolymerization process in a non-aqueous system by adding a non-aqueous radical initiator to a radical polymerizable monomer mixture as explained above. Methods of initiating a radical copolymerization process in a non-aqueous system include (1) methods of initiating a radical copolymerization process without using any solvent, and (2) methods of initiating a radical copolymerization process by using a non-aqueous solvent such as benzene, toluene, xylene, methyl isobutylketone and dioxane and dissolving the radical polymerizable monomer mixture in such a non-aqueous solvent, but the methods of (1) are preferable. A radical copolymerization reaction according to a method of (1) may be initiated, for example, by setting the radical polymerizable monomer mixture in a reactor, adding a non-aqueous radial initiator to it in a nitrogen atmosphere and heating it to 40-60° C. Examples of the non-aqueous radical initiator that may be used in Process 1 include azo initiators such as azobisisobutyronitrile and 2,2'-azobis(4-methoxy 2,4-dimethyl valeronitrile), benzoyl peroxide, lauroyl peroxide and kumene hydroperoxide.

Process 2 is a process of stopping the radical copolymerization reaction initiated in Process 1 in the midst of the reaction while the inversion rate of polymerization defined above becomes 50-90% by adding water to the reaction system and thereby obtaining a reaction mixture containing a copolymer thus produced and residual monomers. In Process 2, the radical copolymerization reaction initiated in Process 1 is stopped during the reaction while the inversion rate of polymerization defined above becomes 50-90%, or preferably 65-85%. Methods of stopping the radical copolymerization reaction in the midst of the reaction while the inversion rate of polymerization becomes 50-90%, or preferably 65-85%, include (1) method of sampling a portion of the reaction mixture from the reaction system periodically, obtaining the ratio of the generated copolymer and the residual monomers by a high-speed method of analysis such as GPC or high-speed liquid chromatography, calculating the inversion rate of polymerization by using the obtained number and thereby determining the time to stop the radical copolymerization reaction; (2) method of preliminarily obtaining the relationship between the torque of the stirrer used for the reaction system and the inversion rate of polymerization and stopping the radical copolymerization reaction on the basis of the obtained relationship at the time when the torque reaches the value corresponding to the desired inversion rate of polymerization; and (3) method of preliminarily obtaining the relationship between the time of the radical copolymerization reaction and the inversion rate of polymerization and stopping the radical copolymerization based on the obtained relationship at the time corresponding to the desired inversion rate of polymerization. From the point of view of freedom and simplicity of equipment, however, the method of (3) is preferable. In any case, if the radical copolymerization reaction is stopped in the midst when the inversion rate of polymerization is not within the range of 50-90%, the obtained product cannot simultaneously provide the desired plurality of functions to hydraulic cement compositions.

The invention does not impose any stringent restriction regarding the temperature at the start of the radical copolymerization reaction of Process 1 or during Process 2 while the radical copolymerization reaction is continued until it is stopped in the midst but it is preferably in the range of 60-90°. Neither is there any restriction imposed on the amount of water to be added for stopping the radical copolymerization reaction in Process 2 but it is preferably 2-10 mols per mol of the maleic anhydride used as the material.

Thus, a reaction mixture containing the generated copolymers and residual monomers is obtained by Process 2. From the point of view of the radical polymerizable monomer mixture used for the radical copolymerization reaction of Process 1, the copolymers that are generated and come to be contained in the reaction mixture are those with constituent units formed with maleic anhydride and monomers shown by Formula 1 but since this radical copolymerization reaction is stopped in the midst of Process 1 by adding water, the constituent units formed with maleic anhydride become constituent units formed with maleic acid as a result of hydrolysis of maleic anhydride. Similarly, from the point of view of the radical polymerizable monomer mixture used for the radical copolymerization reaction of Process 1, the residual monomers that come to be contained in the reaction mixture are those containing at least maleic anhydride and/or monomers shown by Formula 1, but since this radical copolymerization reaction is stopped in the midst of Process 1 by adding water, maleic anhydride becomes maleic acid as a result of hydrolysis.

There is no limitation imposed on the molecular weight of the copolymers that come to be contained in the reaction mixture in Process 2, but those with the top of peak of weight-average molecular weight (hereinafter pullulan converted weight in the measurement by gel-permeation chromatography (or GPC) of 30000-45000 are preferred. Adjustment of weight-average molecular weight can be accomplished by appropriately selecting the kind and the amount of the non-aqueous radical initiator used in Process 1, the kind and amount of the radical chain transfer agent which may be added if necessary in Processes 1 and 2 and the temperature and time of the radical copolymerization in Processes 1 and 2.

Process 3 is a process of partially or completely neutralizing the reaction mixture obtained in Process 2 by means of a basic compound to obtain partially or completely neutralized objects of the aforementioned reaction mixture. Examples of the basic compound to be used for this purpose include (1) alkali metal hydroxides such as sodium hydroxide and potassium hydroxide; (2) alkali earth metal hydroxides such as calcium hydroxide and magnesium hydroxide; and (3) amines such as ammonia and triethanol amine, but alkali metal hydroxides are preferred.

Admixtures of this invention may be used for all kinds of hydraulic cement compositions such as cement pastes, mortars and concrete but they are particularly useful for concrete and particularly useful for high-strength concrete with a small water/cement ratio such as 25-40% or ultra-high strength concrete with a water/cement ratio of 10-25%. The amount of the admixture of this invention to be used is normally 0.1-5 weight parts or preferably 0.15-3.5 weight parts as solid component per 100 weight parts of cement.

Other kinds of additives such as a hardening accelerator, a hardening retarder, a water-proofing agent, a preservative and an anti-rust agent may be added to the admixtures of this invention within the limit of not adversely affecting the effects of the present invention.

Admixtures of this invention have many advantages such that the time required for kneading in the production process not only for hydraulic compositions with a normal water/cement ratio but also for those with a small water/cement ratio is shortened, that prepared hydraulic cement compositions have a lower viscosity and a higher fluidity, the autogeneous shrinkage of hardened objects obtained from the prepared hydraulic cement compositions is smaller and the strength of such hardened objects is higher.

The invention is described next in terms of the following seven embodiments.

(1) Admixture of this invention comprised of reaction mixture (P-1) obtained by Process 1 and Process 2 described below:

Process 1: Process of initiating a radical copolymerization reaction of a radical polymerizable monomer mixture containing maleic anhydride and α-allyl-ω-methyl-polyoxyethylene (molar number of oxyethylene units (=n) being 33) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 72% and thereby obtaining reaction mixture (P-1) containing produced copolymers with weight-average molecular weight of 36000 and residual monomers of maleic acid and α-allyl-ω-methyl-polyoxyethylene (n=33).

(2) Admixture of this invention comprised of reaction mixture (P-2) obtained by Process 1 and Process 2 described below:

Process 1: Process of initiating a radical copolymerization reaction of a radical polymerizable monomer mixture containing maleic anhydride and α-allyl-ω-methyl-polyoxyethylene (n=33) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 83% and thereby obtaining reaction mixture (P-2) containing produced copolymers with weight-average molecular weight of 38000 and residual monomers of maleic acid and α-allyl-ω-methyl-polyoxyethylene (n=33).

(3) Admixture of this invention comprised of reaction mixture (P-3) obtained by Process 1 and Process 2 described below:

Process 1: Process of initiating a radical copolymerization reaction of a radical polymerizable monomer mixture containing maleic anhydride and α-allyl-ω-methyl-polyoxyethylene (n=68) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 78% and thereby obtaining reaction mixture (P-3) containing produced copolymers with weight-average molecular weight of 40300 and residual monomers of maleic acid and α-allyl-ω-methyl-polyoxyethylene (n=68).

(4) Admixture of this invention comprised of reaction mixture (P-4) obtained by Process 1 and Process 2 described below:

Process 1: Process of initiating a radical copolymerization reaction of a radical polymerizable monomer mixture containing maleic anhydride and α-allyl-ω-acetyl-polyoxyethylene (n=23) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 77% and thereby obtaining reaction mixture (P-4) containing produced copolymers with weight-average molecular weight of 35700 and residual monomers of maleic acid and α-allyl-ω-acetyl-polyoxyethylene (n=23).

(5) Admixture of this invention comprised of reaction mixture (P-5) obtained by Process 1 and Process 2 described below:

Process 1: Process of initiating a radical copolymerization reaction of a radical polymerizable monomer mixture containing maleic anhydride and α-allyl-ω-acetyl-polyoxyethylene (n=50) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 80% and thereby obtaining reaction mixture (P-5) containing produced copolymers with weight-average molecular weight of 39000 and residual monomers of maleic acid and α-allyl-ωacetyl-polyoxyethylene (n=50).

(6) Admixture of this invention comprised of partially neutralized object (P-9) obtained by Process 1, Process 2 and Process 3 described below:

Process 1: Process of initiating a radical copolymerization reaction of a radical polymerizable monomer mixture containing maleic anhydride and α-allyl-ω-methyl-polyoxyethylene (n=33) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 72% and thereby obtaining a reaction mixture containing produced copolymers with weight-average molecular weight of 36000 and residual monomers of maleic acid and α-allyl-ω-methyl-polyoxyethylene (n=33).

Process 3: Process of partially neutralizing the reaction mixture obtained in Process 2 with sodium hydroxide and thereby obtaining partially neutralized object (P-9) of this reaction mixture.

(7) Admixture of this invention comprised of completely neutralized object (P-10) obtained by Process 1, Process 2 and Process 3 described below:

Process 1: Process of initiating a radical copolymerization reaction of a radical polymerizable monomer mixture containing maleic anhydride and α-allyl-ω-acetyl-polyoxyethylene (n=50) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 80% and thereby obtaining a reaction mixture containing produced copolymers with weight-average molecular weight of 39000 and residual monomers of maleic acid and α-allyl-ω-acetyl-polyoxyethylene (n=50).

Process 3: Process of completely neutralizing the reaction mixture obtained in Process 2 with sodium hydroxide and thereby obtaining completely neutralized object (P-10) of this reaction mixture.

In what follows, some test examples are shown in order to further explain the invention and its effects but these examples are not intended to limit the scope of the invention.

TEST EXAMPLES

Part 1 (Synthesis of Reaction Mixtures as Admixtures)

Test Example 1

Synthesis of Reaction Mixture (P-1)

Maleic anhydride 147 g (1.5 moles) and α-allyl-ω-methyl-polyoxyethylene (n=33) 1524 g (1.0 mole) were placed inside a reactor and after they were dissolved uniformly with stirring, the atmosphere was replaced with nitrogen. While the reacting system was maintained at 80° C. with a hot water bath, azobisisobutylonitrile 5.8 g was added to start a radical polymerization reaction. After 2 hours of the radical copolymerization process, it was stopped by adding 83 g of water to the reacting system to obtain a reaction mixture. This reaction mixture was analyzed by GPC and found as a result to contain copolymer with weight-average molecular weight of 36000 with a constituent unit formed with maleic acid and a constituent unit with α-allyl-ω-methyl-polyoxyethylene (n=33), maleic acid and α-allyl-ω-methyl-polyoxyethylene (n=33), and its inversion ratio of polymerization defined above was 72%.

FIG. 1 shows the GPC graph of the reaction mixture (P-1). In FIG. 1, numeral 1 indicates the peak of the generated copolymer, numeral 2 indicates the peak of α-allyl-ω-methyl-polyoxyethylene (n=33), numeral 3 indicates the peak of maleic acid and numeral 4 shows the peak top.

Test Examples 2-8

Syntheses of Reaction Mixtures (P-2)-(P-8)

Reaction mixtures (P-2)-(P-8) were synthesized similarly as explained above.

Test Example 9

Synthesis of Partially Neutralized Object (P-9)

A 40% aqueous solution 500 g of aforementioned reaction mixture (P-1) obtained in Test Example 1 was placed inside a reactor and a 30% aqueous solution of sodium hydroxide 29 g was gradually added with stirring to carry out partial neutralization and to thereby obtain partially neutralized object (P-9) of reaction mixture (P-1) with degree of neutralization 60%.

Test Example 10

Synthesis of Completely Neutralized Object (P-10)

A 40% aqueous solution 500 g of aforementioned reaction mixture (P-5) obtained in Test Example 5 was placed inside a reactor and a 30% aqueous solution of sodium hydroxide 32.7 g was gradually added with stirring to carry out complete neutralization and to thereby obtain completely neutralized object (P-10) of reaction mixture (P-5) with degree of neutralization 100%.

Comparison Example 1

Synthesis of Reaction Mixture (R-1)

Maleic anhydride 147 g (1.5 moles) and α-allyl-ω-methyl-polyoxyethylene (n=33) 1524 g (1.0 mole) were placed inside a reactor and after they were dissolved uniformly with stirring, the atmosphere was replaced with nitrogen. While the reacting system was maintained at 80° C. with a hot water bath, azobisisobutylonitrile 5.8 g was added to start a radical polymerization reaction. After 50 minutes of the radical copolymerization process, it was stopped by adding 83 g of water to the reacting system to obtain a reaction mixture. This reaction mixture was analyzed by GPC and found as a result to contain copolymer with weight-average molecular weight of 29500 with a constituent unit formed with maleic acid and a constituent unit with α-allyl-ω-methyl-polyoxyethylene (n=33), maleic acid and α-allyl-ω-methyl-polyoxyethylene (n=33), and its inversion ratio of polymerization defined above was 43%.

Comparison Examples 2-7

Syntheses of Reaction Mixtures (R-2)-(R-7)

Reaction mixtures (R-2)-(R-7) were synthesized similarly as explained above re Comparison Example 1.

Comparison Example 8

Synthesis of Completely Neutralized Object (R-8)

As done in Test Example 10, reaction mixture (R-2) obtained in Comparison Example 2 was completely neutralized with sodium hydroxide to obtain completely neutralized object (R-8) with degree of neutralization 100%.

Details of these reaction mixtures obtained in these Examples are summarized in Table 1.

TABLE 1

| | | Process 1 Monomers (molar %) | | | Process 2 | | Process 3 |
|---|---|---|---|---|---|---|---|
| | | (A) Maliec anhydride (molar %) | (B) Monomers of Formula 1 (Kind/molar %) | (A)/(B) | IRP (%) | Weight-average molecular weight of copolymer | Basic compound used |
| Text Example | | | | | | | |
| 1 | P-1 | 60 | d-1/40 | 60/40 | 72 | 36000 | |
| 2 | P-2 | 60 | d-1/40 | 60/40 | 83 | 38000 | |
| 3 | P-3 | 60 | d-2/40 | 60/40 | 78 | 40300 | |
| 4 | P-4 | 60 | d-3/40 | 60/40 | 77 | 35700 | |
| 5 | P-5 | 60 | d-4/40 | 60/40 | 80 | 39000 | |
| 6 | P-6 | 55 | d-1/45 | 55/45 | 72 | 34000 | |
| 7 | P-7 | 65 | d-4/35 | 65/35 | 80 | 37000 | |
| 8 | P-8 | 57 | d-5/40 d-6/3 | 59/41 | 70 | 40800 | |
| 9 | P-9 | 60 | d-1/40 | 60/40 | 72 | 36000 | NaOH |
| 10 | P-10 | 60 | d-4/40 | 60/40 | 80 | 39000 | NaOH |
| Comparison Example | | | | | | | |
| 1 | R-1 | 60 | d-1/40 | 60/40 | 43 | 29500 | |
| 2 | R-2 | 60 | d-1/40 | 60/40 | 92 | 50000 | |
| 3 | R-3 | 60 | d-4/40 | 60/40 | 93 | 53500 | |
| 4 | R-4 | 60 | d-5/40 | 60/40 | 95 | 57500 | |
| 5 | R-5 | 60 | dr-1/40 | 60/40 | 88 | 64000 | |
| 6 | R-6 | 45 | d-1/55 | 45/55 | 69 | 35000 | |
| 7 | R-7 | 75 | d-1/25 | 75/25 | 76 | 39000 | |
| 8 | R-8 | 60 | d-1/40 | 60/40 | 92 | 50000 | NaOH |

In Table 1:
IRP: Inversion rate of polymerization
d-1: α-allyl-ω-methyl-polyoxyethylene (n = 33)
d-2: α-allyl-ω-methyl-polyoxyethylene (n = 68)
d-3: α-allyl-ω-acetyl-polyoxyethylene (n = 23)
d-4: α-allyl-ω-acetyl-polyoxyethylene (n = 50)
d-5: α-allyl-ω-hydroxy-polyoxyethylene (n = 80) polyoxypropylene (molar number of oxypropylene = 5)
d-6: Styrene
dr-1: α-allyl-ω-acetyl-polyoxyethylene (n = 170)

Part 2 (Preparation and Evaluation of Concrete)

Preparation of Concrete

Concrete samples were prepared under the conditions shown in Table 2. For the preparation of high-strength concrete (Mixture No. 1), normal portland cement (specific weight=3.16, braine value=3300), fine aggregates (Ooi-gawa River sand with specific weight=2.58) and coarse aggregates (crushed stones from Okazaki with specific weight=2.68) were sequentially added into a forced-mixing pan-type mixer with capacity 50 liters and subjected to a free kneading process for 15 seconds. Next, reaction mixtures prepared in Part 1 and described in Table 1 and a defoamer (tradename of AFK-2 produced by Takemoto Yushi Kabushiki Kaisha) were kneaded together, added with water and kneaded for 180 seconds to prepare concrete samples such that the target slump would be within the range of 65±5 cm and the target air content would be within the range of 2±0.5%. For the preparation of ultra-high strength concrete (Mixture No. 2), silica fume cement (specific weight=3.08, braine value=5600), fine aggregates (Ooi-gawa River sand with specific weight=2.58) and coarse aggregates (crushed stones from Okazaki with specific weight=2.68) were sequentially added into a forced-mixing pan-type mixer with capacity 50 liters and subjected to a free kneading process for 15 seconds. Next, reaction mixtures prepared in Part 1 and described in Table 1 and the defoamer described above were kneaded together, added with water and kneaded for 300 seconds to prepare concrete samples such that the target slump would be within the range of 65±5 cm and the target air content would be within the range of 2±0.5%.

TABLE 2

| | | | Unit amount (kg/m³) | | | | |
|---|---|---|---|---|---|---|---|
| Mixture | Water/cement ratio (%) | Fine aggregates (%) | Water | Normal cement | Silica fume cement | Fine aggregates | Coarse aggregates |
| No. 1 | 30 | 48.8 | 160 | 533 | — | 820 | 895 |
| No. 2 | 17 | 35.8 | 160 | — | 941 | 475 | 884 |

Evaluation of Concrete

For each of the concrete samples, slump flow, air content, time for kneading, autogeneous shrinkage strain and compressive strength were obtained as below and the results are shown together in Tables 3-6.

Slump flow: Measured according to JIS-A1150 on concrete immediately after kneading.

Air content: Measured according to JIS-A1128 on concrete immediately after kneading.

Kneading time: A clamp meter (an electric current meter) was connected to the forced-mixing pan-type mixer to record the time of kneading and the waveform of the load current of the mixer by means of a recorder and the time required for the load current reached the maximum value was recorded as the kneading time.

L-flow velocity: Measured by using an L-flow meter (described in "Proposed Guideline in Materials, Mixing, Production and Practice for High-Range Concrete" by Japan Architecture Institute). The flow speed between 5 cm and 10 cm from the flow-starting surface of the L-flow meter was defined as the flow speed. If the slump flow is the same, a large initial L-flow speed corresponds to a low viscosity.

Autogeneous shrinkage strain: Measured according to the description in "Test Method for Autogeneous Shrinkage and Autogeneous Expansion of Concrete" by Japan Concrete Institute. A smaller numerical value of autogeneous shrinkage strain indicates a smaller antogenous shrinkage.

Compressive strength: Measured at material ages of 7 days and 28 days according to JIS-A1108.

TABLE 4

| Example | Autogeneous shrinkage strain at age 24 hours ($\times 10^{-4}$) | Compressive strength (N/mm$^2$) | |
|---|---|---|---|
| | | Age 7 days | Age 28 days |
| 1 | 1.6 | 80 | 100 |
| 2 | 1.6 | 80 | 101 |
| 3 | 1.6 | 80 | 100 |
| 4 | 1.5 | 81 | 103 |
| 5 | 1.6 | 81 | 102 |
| 6 | 1.5 | 80 | 100 |
| 7 | 1.6 | 81 | 102 |
| 8 | 1.7 | 78 | 97 |
| 9 | 1.6 | 80 | 100 |
| 10 | 1.6 | 80 | 101 |
| 11 | — | — | — |
| 12 | 1.9 | 75 | 95 |
| 13 | 1.9 | 74 | 93 |
| 14 | 2.0 | 76 | 96 |
| 15 | 2.0 | 71 | 90 |
| 16 | 2.0 | 77 | 95 |
| 17 | 1.9 | 75 | 96 |
| 18 | 1.9 | 73 | 91 |
| 19 | 2.0 | 76 | 96 |

TABLE 3

| Example | Reaction mixture Kind | Reaction mixture Amount*2 | Mixing No. of Table 2 | Slump flow (cm) | Air content (%) | Kneading time (sec) | L-flow velocity (cm/sec) |
|---|---|---|---|---|---|---|---|
| 1 | P-1 | 0.28 | 1 | 65.5 | 1.9 | 52 | 13.2 |
| 2 | P-2 | 0.27 | 1 | 66.0 | 1.8 | 49 | 14.1 |
| 3 | P-3 | 0.31 | 1 | 64.0 | 2.0 | 63 | 12.3 |
| 4 | P-4 | 0.27 | 1 | 67.0 | 1.7 | 45 | 14.5 |
| 5 | P-5 | 0.29 | 1 | 65.0 | 1.8 | 54 | 12.4 |
| 6 | P-6 | 0.33 | 1 | 64.5 | 1.7 | 71 | 13.1 |
| 7 | P-7 | 0.28 | 1 | 65.0 | 1.9 | 53 | 13.0 |
| 8 | P-8 | 0.35 | 1 | 63.0 | 2.1 | 67 | 10.8 |
| 9 | P-9 | 0.29 | 1 | 64.0 | 1.8 | 53 | 12.6 |
| 10 | P-10 | 0.30 | 1 | 64.5 | 1.9 | 54 | 12.2 |
| 11 | R-1 | *3 | 1 | — | — | — | — |
| 12 | R-2 | 0.32 | 1 | 64.0 | 2.0 | 115 | 9.7 |
| 13 | R-3 | 0.35 | 1 | 63.5 | 1.8 | 122 | 8.6 |
| 14 | R-4 | 0.58 | 1 | 63.0 | 1.9 | 130 | 7.2 |
| 15 | R-5 | 0.70 | 1 | 61.5 | 2.1 | 160 | 5.4 |
| 16 | R-6 | 0.37 | 1 | 65.2 | 2.0 | 105 | 9.3 |
| 17 | R-7 | 0.33 | 1 | 63.0 | 2.2 | 120 | 9.5 |
| 18 | R-8 | 0.65 | 1 | 64.0 | 1.9 | 128 | 9.0 |
| 19 | R-9 | 0.35 | 1 | 65.8 | 1.9 | 90 | 9.5 |

In Table 3:
*2Weight part as solid component of reaction mixture per 100 weight parts of cement.
*3: Target slump flow could not be obtained because of insufficient fluidity although added amount was increased.
R-9: High-range water reducing agent for high-strength concrete (tradename: Chupol HP-11, produced by Takemoto Yushi Kabushhiki Kaisha)

TABLE 5

| Example | Reaction mixture Kind | Reaction mixture Amount*2 | Mixing No. of Table 2 | Slump flow (cm) | Air content (%) | Kneading time (sec) | L-flow velocity (cm/sec) |
|---|---|---|---|---|---|---|---|
| 20 | P-1 | 0.43 | 2 | 68.5 | 1.7 | 93 | 6.1 |
| 21 | P-2 | 0.42 | 2 | 68.0 | 1.6 | 89 | 6.3 |
| 22 | P-3 | 0.54 | 2 | 66.5 | 1.6 | 97 | 6.0 |
| 23 | P-4 | 0.42 | 2 | 69.0 | 1.6 | 84 | 6.5 |
| 24 | P-5 | 0.47 | 2 | 67.0 | 1.7 | 95 | 6.2 |
| 25 | P-6 | 0.57 | 2 | 66.5 | 1.6 | 99 | 6.2 |
| 26 | P-7 | 0.42 | 2 | 67.0 | 1.8 | 89 | 6.0 |
| 27 | P-8 | 0.78 | 2 | 66.0 | 1.9 | 99 | 5.8 |
| 28 | P-9 | 0.44 | 2 | 68.0 | 1.6 | 92 | 6.0 |
| 29 | P-10 | 0.31 | 2 | 67.5 | 1.7 | 95 | 6.0 |
| 30 | R-1 | *3 | 2 | — | — | — | — |
| 31 | R-2 | 0.60 | 2 | 63.3 | 2.0 | 195 | 4.4 |
| 32 | R-3 | 0.69 | 2 | 65.7 | 2.1 | 202 | 4.3 |
| 33 | R-4 | *3 | 2 | — | — | — | — |
| 34 | R-5 | *3 | 2 | — | — | — | — |
| 35 | R-6 | 0.65 | 2 | 64.5 | 1.8 | 190 | 4.8 |
| 36 | R-7 | 0.64 | 2 | 64.8 | 1.8 | 171 | 5.6 |
| 37 | R-8 | 0.75 | 2 | 62.0 | 1.7 | 230 | 4.0 |
| 38 | R-10 | 0.78 | 2 | 64.0 | 1.7 | 186 | 5.0 |
| 39 | R-11 | 0.57 | 2 | 64.0 | 2.0 | 178 | 5.1 |
| 40 | R-12 | *3 | 2 | — | — | — | — |
| 41 | R-13 | 0.62 | 2 | 64.0 | 1.9 | 160 | 4.2 |

In Table 5:
R-10: Mixture of reaction mixture (R-2) and monomer (d-1) of Table 1 at weight ratio of 80/20;
R-11: Mixture of reaction mixture (R-2) and maleic acid at weight ratio of 97.5/2.5;
R-12: Mixture of reaction mixture (R-2), monomer (d-1) of Table 1 and maleic acid at weight ratio of 80/17.5/2.5;
R-13: High-range water reducing agent for high-strength concrete (tradename: Chupol SSP-104, produced by Takemoto Yushi Kabushhiki Kaisha).

TABLE 6

| Example | Autogeneous shrinkage strain at age 24 hours ($\times 10^{-4}$) | Compressive strength (N/mm$^2$) Age 7 days | Compressive strength (N/mm$^2$) Age 28 days |
|---|---|---|---|
| 20 | 3.8 | 105 | 144 |
| 21 | 3.8 | 106 | 145 |
| 22 | 4.0 | 104 | 144 |
| 23 | 3.7 | 105 | 146 |
| 24 | 3.9 | 104 | 145 |
| 25 | 3.7 | 104 | 144 |
| 26 | 3.9 | 106 | 146 |
| 27 | 4.0 | 100 | 140 |
| 28 | 3.8 | 104 | 146 |
| 29 | 3.9 | 106 | 145 |
| 30 | — | — | — |
| 31 | 4.5 | 101 | 139 |
| 32 | 4.6 | 96 | 133 |
| 33 | — | — | — |
| 34 | — | — | — |
| 35 | 4.5 | 102 | 140 |
| 36 | 4.6 | 103 | 140 |
| 37 | 4.5 | 93 | 134 |
| 38 | 4.5 | 91 | 130 |
| 39 | 4.9 | 99 | 135 |
| 40 | — | — | — |
| 41 | 4.9 | 105 | 142 |

What is claimed is:

1. A multi-functional admixture for hydraulic cement compositions, said admixture comprising one or more selected from the group consisting of specified reaction mixtures obtained by Process 1 and Process 2 and partially or completely neutralized substances obtained by said Process 1, said Process 2 and further Process 3 wherein said Process 1 is a process of initiating a radical copolymerization process of a radical polymerizable monomer mixture containing maleic anhydride and a monomer shown by Formula 1 by 97 molar % or more at a molar ratio of 50/50-70/30 in a non-aqueous system in the presence of a non-aqueous radical initiator, said Process 2 is a process of stopping the radical copolymerization reaction initiated in said Process 1 in the midst of the reaction while the inversion rate of polymerization defined by $\{(TM-UM)/TM\}\times 100$ becomes 50-90% by adding water to the reaction system and thereby obtaining a reaction mixture containing a copolymer thus produced and residual monomers, TM indicating the total weight of the radical polymerizable monomer mixture at the start of the radical polymerization reaction in said Process 1 and UM indicating the total weight of the residual monomers when the radical copolymerization reaction is stopped in said Process 2, said Process 3 is a process of partially or completely neutralizing the reaction mixture obtained in said Process 2 by one or two selected from the group consisting of alkali metal hydroxides, alkali earth metal hydroxides and amines, and said Formula 1 is given by $CH_2$=CH—$CH_2$—O-A-O—R where R is methyl group, acetyl group or hydrogen atom and A is a residual group obtained by removing all hydroxyl groups from (poly)alkyleneglycol having (poly)oxyalkylene groups formed with 1-150 oxyethylene units or a total of 2-150 oxyethylene and oxypropylene units.

2. The multi-functional admixture of claim 1 wherein said Process 1 is a process of initiating a radical copolymerization process of a radical polymerizable monomer mixture without using any solvent in a non-aqueous system.

3. The multi-functional admixture of claim 2 wherein said radical polymerizable monomer mixture of said Process 1 is a mixture of maleic anhydride and a monomer shown by said Formula 1.

4. The multi-functional admixture of claim 2 wherein said reaction mixture of said Process 2 is obtained by stopping said radical copolymerization reaction in the midst of the reaction while the inversion rate of polymerization is 65-85%.

5. The multi-functional admixture of claim 3 wherein said reaction mixture of said Process 2 is obtained by stopping said radical copolymerization reaction in the midst of the reaction while the inversion rate of polymerization is 65-85%.

6. The multi-functional admixture of claim 4 wherein said Process 2 produces as reaction product copolymers with the top of peak of pullulan converted weight-average molecular weight of 30000-45000 in a measurement by gel-permeation chromatography.

7. The multi-functional admixture of claim 5 wherein said Process 2 produces as reaction product copolymers with the top of peak of pullulan converted weight-average molecular weight of 30000-45000 in a measurement by gel-permeation chromatography.

8. The multi-functional admixture of claim 6 wherein R is methyl group or acetyl group and A is residual group obtained by removing all hydroxyl groups from polyethyleneglycol having polyoxyethylene group with 15-90 oxyethylene units in said Formula 1.

9. The multi-functional admixture of claim 7 wherein R is methyl group or acetyl group and A is residual group obtained by removing all hydroxyl groups from polyethyleneglycol having polyoxyethylene group with 15-90 oxyethylene units in said Formula 1.

* * * * *